United States Patent [19]
Bannon et al.

[11] Patent Number: 5,456,057
[45] Date of Patent: Oct. 10, 1995

[54] DISPLAY PACKAGE FOR CIRCULAR SAW BLADE OR SIMILAR ARTICLE, AND METHOD

[75] Inventors: George B. Bannon, Shelbyville, Ky.; Leonard R. Baublitz, Millers, Md.; Charles E. Kalomeris, Shrewsbury, Pa.; Paul J. Schweiger, Louisville, Ky.

[73] Assignee: Black & Decker Inc., Newark, Del.

[21] Appl. No.: 210,837

[22] Filed: Mar. 18, 1994

[51] Int. Cl.⁶ .................... B65B 11/58; B65B 15/00; B65B 25/24
[52] U.S. Cl. .................... 53/449; 53/173; 53/254; 53/442; 53/467; 53/473; 206/349; 206/493
[58] Field of Search .............. 53/473, 471, 467, 53/409, 449, 254, 442, 441, 455, 456, 462, 204, 207, 206, 173, 556, 557, 580, 581, 397, 139.3; 206/349, 493, 491, 471, 477, 482, 354

[56] References Cited

U.S. PATENT DOCUMENTS

| | | | |
|---|---|---|---|
| D. 117,068 | 10/1939 | Laitman | D9/415 |
| 1,500,136 | 7/1924 | Knowlton | 206/349 X |
| 2,325,673 | 8/1943 | Gurwick | 53/455 X |
| 2,459,460 | 1/1949 | Segal | 206/349 |
| 2,601,426 | 6/1952 | Baumann | 206/349 |
| 2,950,004 | 8/1960 | Acomb | 206/349 |
| 2,954,118 | 9/1960 | Anderson | 206/349 |
| 3,259,231 | 7/1966 | Romanowski et al. | 206/349 |
| 3,523,397 | 8/1970 | Carey et al. | 53/442 X |
| 3,592,337 | 7/1971 | Phillips, Jr. | 206/491 X |
| 3,972,417 | 8/1976 | Iten et al. | 206/461 X |
| 4,496,052 | 1/1985 | Nertman | 206/461 X |
| 4,588,082 | 5/1986 | Ridings | 206/349 |
| 4,739,883 | 4/1988 | Mohs et al. | 206/461 X |
| 4,784,263 | 11/1988 | Stanley | 206/349 |
| 4,848,571 | 7/1989 | Fullar | 206/493 X |
| 4,896,771 | 1/1990 | Edwards | 206/349 |
| 5,238,107 | 8/1993 | Kownacki | 206/493 X |

FOREIGN PATENT DOCUMENTS

| | | |
|---|---|---|
| 2533235 | 2/1977 | Germany. |
| 583267 | 10/1958 | Italy. |

*Primary Examiner*—James F. Coan
*Attorney, Agent, or Firm*—Charles E. Yocum; Dennis A. Dearing; John D. Del Ponti

[57] ABSTRACT

A display package for a circular saw blade or similar article having an aperture including a paperboard display card upon which is mounted the blade or article by means of a deformable connecting member which is reusable so that the package is also used for storage of the blade or article. The display card is provided with a pocket or pouch in which a portion of the blade or article is inserted such that an area of descriptive information is visible to a perspective purchaser. A length of protective material such as clear split plastic tubing is wrapped around the periphery of the blade or article to cover at least a portion of the saw blade teeth, and a layer of shrink-wrap is applied over the entire package.

30 Claims, 3 Drawing Sheets

DISPLAY PACKAGE FOR CIRCULAR SAW BLADE OR SIMILAR ARTICLE, AND METHOD

FIELD OF THE INVENTION

The invention relates to display packages for circular saw blades, or similar articles, and a method for packaging them. The invention is particularly directed to a display package with a blade-receiving pocket that permits the perspective purchaser to see descriptive information on the saw blade. The invention permits the purchaser to remove the saw blade after purchase without destroying the usefulness of the package as a container for the blade when the owner later desires to store it.

BACKGROUND OF THE INVENTION

Various packaging arrangements for circular saw blades or similar articles have been in use for many years. However, such conventional packages as skin packs and blister packs hide or distort such key features as saw blade tooth design. Also, current packaging systems for circular saw blades are hard to open and require that the user destroy the package in order to remove the blade. Finally, there are packaging and transporting schemes which are cumbersome, require the use of metal fasteners or the like, and are not totally recyclable.

SUMMARY OF THE INVENTION

It has been realized that there is a need for a display package for a tool like a circular saw blade which permits key features like tooth design and various descriptive information on the blade itself to be visible to a perspective purchaser, yet which does not distort their appearance to the perspective purchaser. It has also been realized that there is a need for a way to securely package such a tool so that the package can be shipped and displayed, yet enabling the purchaser to readily remove the tool while leaving the package intact so it can be used later to store the tool. All of these needs, it has also been recognized, should be met by a system that it can be manufactured at the lowest possible cost.

An object of the present invention is to be able to securely hold the circular saw blade or similar tool or article in the package, while permitting the purchaser to remove the blade without destroying the package's usefulness as a means for storing the blade when the operator is finished using it.

It is a particular object of the preferred embodiments of the invention to provide a display card having a card aperture aligned with an aperture in the saw blade or tool so that connecting means operatively associated with the card aperture and tool aperture releaseably holds the tool in place. A feature by which the above objects can be attained is by providing a connecting member having first and second retaining portions, and by inserting one of the retaining portions through the aligned apertures such that the first retaining portion is adjacent the blade and the second retaining portion is adjacent to the card. A preferred feature is to form the first retaining portion as a deformable post which is inserted through the aligned apertures, then deforming the distal ends of the posts by heat and pressure to deform the post diameter to be greater than the blade aperture. The second retaining portion includes a flange portion which bears against the card at the rear of the package. When the deformable post is deformed, that sandwiches the blade and display card together. The diameter of the deformed post is small enough, however, to permit the purchaser, upon opening the package, to pull the post out the back of the "sandwich" without destroying the package.

Another feature by which the above objects can be attained is by optionally providing the display card with a pocket or pouch portion into which the circular saw blade or similar article may be inserted. Yet another preferred feature is to size the height of the pocket or pouch to be large enough to hold the blade in place when the package is hung on a display stand, while still allowing descriptive information on the blade and various features thereof to be visible to the eye of a prospective purchaser.

Another preferred feature is to wrap a transparent protective member or sleeve about the periphery of the saw blade to cover at least a portion of the saw blade teeth.

Yet another preferred feature is to apply a layer of shrink-wrap about the entire outer surface of the blade-package combination.

Finally, other preferred features are to provide a finger-grasping portion on the flange portion of the connecting member, and one or more hang holes in the upper portion of the card so that it may be hung on a display stand.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which like reference characters in the same or different Figures indicate like parts.

DETAILED DESCRIPTION OF THE PREFERRED EMBODIMENTS

Figure 1:
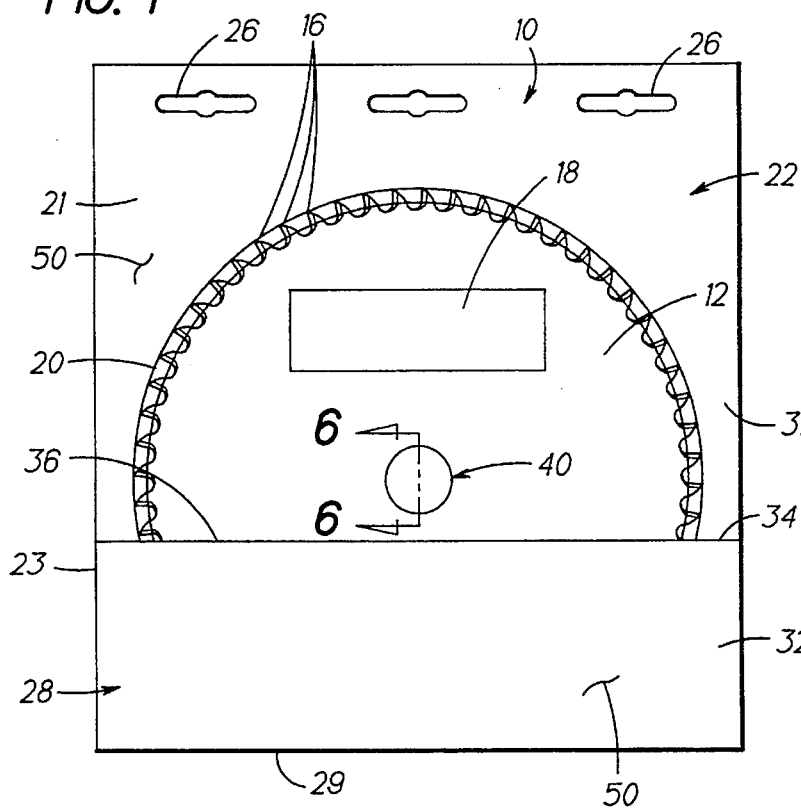
FIG. 1 is a front elevational view of a display package of the present invention with the circular saw blade packaged therein, and enveloped in a layer of shrink-wrap material.
Figure 3:
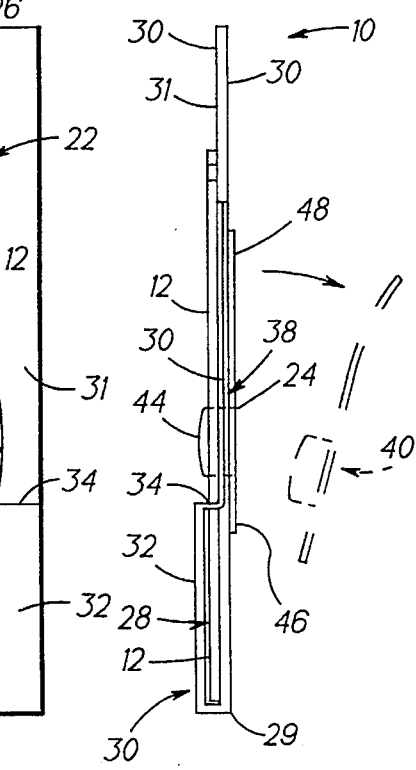
FIG. 3 is a side elevational schematic detail view of the display package of FIG. 1, with the shrink-wrap removed, and showing the retaining member in phantom being removed from the package.
Figure 2:
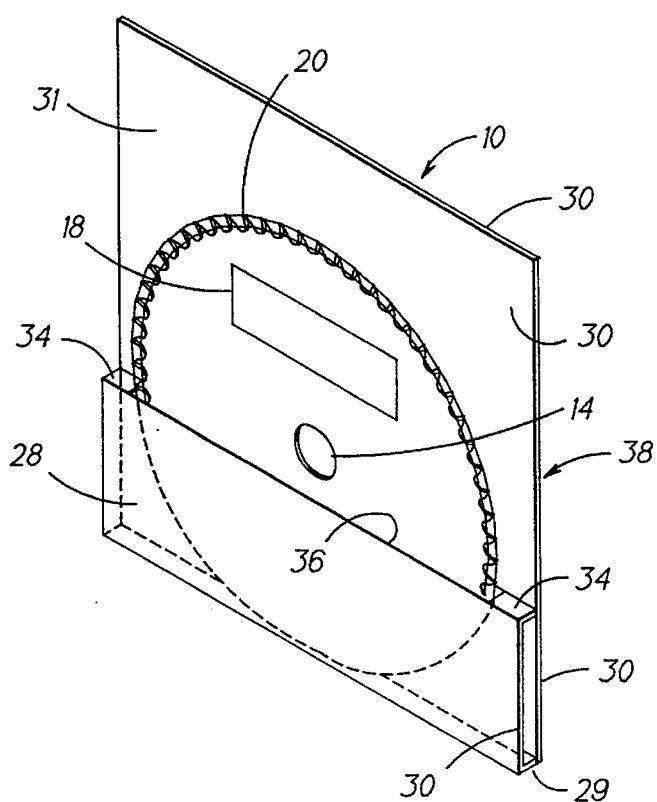
FIG. 2 is a right front perspective view of the display package and circular saw blade of the present invention with portions omitted for clarity.

Referring first to FIGS. 1, 2 and 3, the display package and saw blade combination of the present invention is referred to generally as 10. As shown in FIGS. 1 and 2, a circular saw blade 12 defines a central aperture 14 and includes a plurality of saw blade teeth 16 spaced about its outer periphery. The saw blade further includes descriptive information such as size, quantity of teeth and brand. This information is shown schematically as 18. In the embodiment disclosed in FIGS. 1 and 2, the saw blade is a Black & Decker PIRANHA® carbide-tip circular saw blade, but it can be appreciated by one of ordinary skill in the art that the present invention is applicable to most types of circular saw blades, or other planar or disk-shaped tools, such as cut-off wheels, sanding disks and similar articles. The packaging of the present invention is appropriate for use, for example, with such blade sizes as 5 ½–7 ¼ inches, 8–8 ¼ inches, and 10 inch and 12 inch circular saw blades. Referring now to FIG. 1, a length of split transparent plastic tubing 20 is located around the periphery of the saw blade and substantially covers the saw teeth. This protective member can be made from plastic and may have a "U"-shaped cross-section. A display card 22 includes an upper portion 21 and a lower portion 23, and further defines a hole or connecting aperture 24 (as can be particularly seen in FIGS. 3 and 5B). The display card 22 also defines at least one, and preferably three, hang holes or mounting apertures 26.

A pocket or pouch 28 is formed on the lower portion 23 of the display card 22. The display card is made from a single length of paperboard material, namely 24-point (0.024") solid bleached sulfate, coated one side with a top coat of standard printing varnish. The single length of paperboard material is folded in a double layer. One layer or flap 32 of paperboard material extends outwardly from a lower edge 29 of the lower portion 23 of the display card 22, by an amount equal to a distance greater than the thickness of the circular saw blade or similar article 12, as is shown particularly in FIGS. 2 and 3. It then extends upwardly to a predetermined height in a plane parallel to a front face 31 of the display card 22, and then inwardly to and joining the front face, thereby forming a pouch upper surface 34, which defines a tool-receiving slot 36 sized for the particular diameter of circular saw blade or similar article being used. The portion of the pocket or pouch 28 forming the pouch upper surface 34 is then tucked in between the two layers of paperboard material 30 and glued to form a three-layered region 38 where the hole or connecting aperture 24 is formed.

Figure 4:
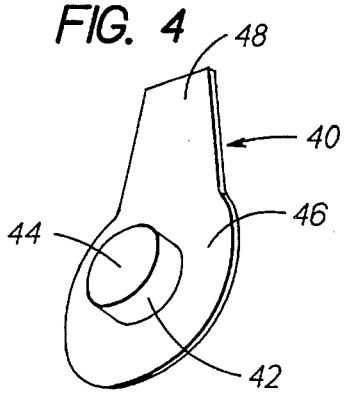
FIG. 4 is a perspective detail view of the retaining member shown in FIG. 3.

Now referring to FIGS. 3 and 4, a one-piece unitary connecting member is designated generally as 40. It includes a first retaining portion or post 42 having a distal end 44 and a second retaining portion or flange 46 on which is formed a finger-grasping portion 48. As shown schematically in FIG. 3, part of the connecting member 40 is inserted in the display card hole or connecting aperture 24, which is in alignment with the saw blade central aperture 14. At this point, it should be noted that by forming a three-layered paperboard region 38, it will be necessary to form three separate holes, one for each layer. It has been found that by making one or more of the holes 24 a larger diameter than the other, any slight misalignment or tolerance stack-up can be compensated such that the post 42 of the connecting member can still be readily inserted through the three-layer region 38. As will be later described, the distal end portion 44 of the post 42 is deformable and, as shown schematically in FIG. 3 is deformed to a diameter greater than that of the saw blade aperture 14 but not so great as to prevent the user from readily removing the connecting member 40 by manually pulling the portion 48. This is shown schematically in phantom in FIG. 3. This way the user can remove the connecting member 40 from the sandwich of saw blade 12 and three-layer region of paperboard material 38 without destroying the usefulness of the package 10 as a storage vehicle for the saw blade 12 or similar article after the user is finished with it. This is one of the advantages of the present invention over conventional packaging systems.

Figure 6:
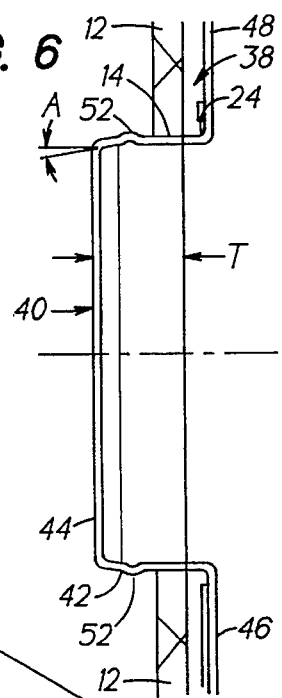
FIG. 6 is an elevational sectional detail view of the retaining member inserted in the saw blade and display card of the present invention, taken along line 6—6 of FIG. 1.

The mushrooming shown in FIG. 3 is exaggerated; the actual appearance of the deformed post 42 is more closely shown in FIG. 6. Here only a slight bulge 52 is created by applying force and heat to the distal end 44 of the connecting member 40. The diameter of the post 42 at the bulge 52 is approximately only one millimeter greater than its non-deformed diameter. Further, the height of the post 42 is reduced only by about three millimeters. The deformation, although slight, is sufficient to retain the saw blade or similar article 12 in place on the card 22. For the particular embodiment shown, it has been found that for circular saw blades in the size range from 5 ½" to 7 ¼ and from 8" to 8 ¼", the material from which the connecting member is made can be 0.015" thick polyvinyl chloride (PVC), and that the post 42 may have a diameter of approximately 0.625" and inserted a thickness T of approximately 0.25". For 10" and 12" diameter saw blades, it has been found that a satisfactory connecting member 40 can be constructed of 0.020" thick polyvinyl chloride, and that the diameter of the post 42 can be approximately 1" with an approximate height of 0.30". For both sizes of connecting members 40, the diameter of the flange 46 may be approximately 2" and the overall length from the tip of the finger-grasping portion 48 to its opposite end is approximately 3". Referring again to FIG. 6, the angle "A" is approximately 1020 for both sizes. This angle is selected to provide suitable manufacturing draft and stackability, the manufacturing of the connecting member 40 being done by conventional thermoforming techniques.

Referring once again to FIG. 1, the outermost part of the package 10 is a layer of shrink-wrap shown schematically by the wavy lines 50. The shrink-wrap 50 is applied also using conventional techniques, and serves to further maintain the saw blade or similar article 12 in place on the package.

Although the embodiments shown in the Figures of the package of the present invention use a pouch or pocket 28, and the pouch is shown extending perpendicular to the sides of the package and parallel to the top and bottom edges, it should be noted that the present invention is not restricted to that configuration. It has been found that suitable packages for the saw blade or similar article 12 can be constructed by using the connecting member 40 of the present invention, but without using a pouch or pocket 28 of any kind whatsoever. A display card without any pouch can be formed with a hole or connecting aperture similar to the aperture 24 used for the "pouched" version, and the same type of connecting member 40 can be used to connect the saw blade or similar article 12 to the display card 22 and in the same fashion, as noted above. A layer of shrink-wrap may then be applied, also as noted above, if desired. In the event a pouch or pocket is used, it need not have the configuration shown in FIG. 1. For example, it may be angled relative to the rectangular display card, curvilinear, scalloped, or "V"-shaped to name a few configurations. In that event, it is necessary merely to locate the pocket relative to the blade so that the desired descriptive information 18, or significant features of the saw blade or similar article such as the teeth 16, may be seen by a potential purchaser when the package 10 is hung on a display rack. The feature that is retained from one embodiment to the next of the present invention is the use of the connecting member 40, such that a portion of the post 42 acts as a retainer against one face of the saw blade-card "sandwich" while the flange 46 engages or bears against the other part of the sandwich, thereby holding the sandwich elements together.

Figure 5A:
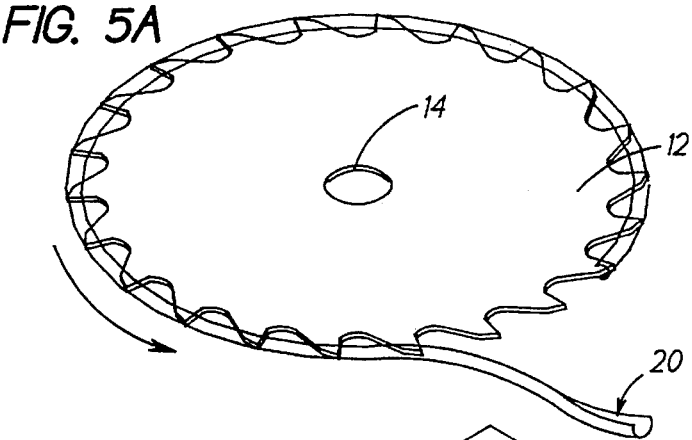
FIGS. 5A, 5B and 5C schematically show three steps in the packaging of a circular saw blade or similar article according to the method of the present invention.
Figure 5B:
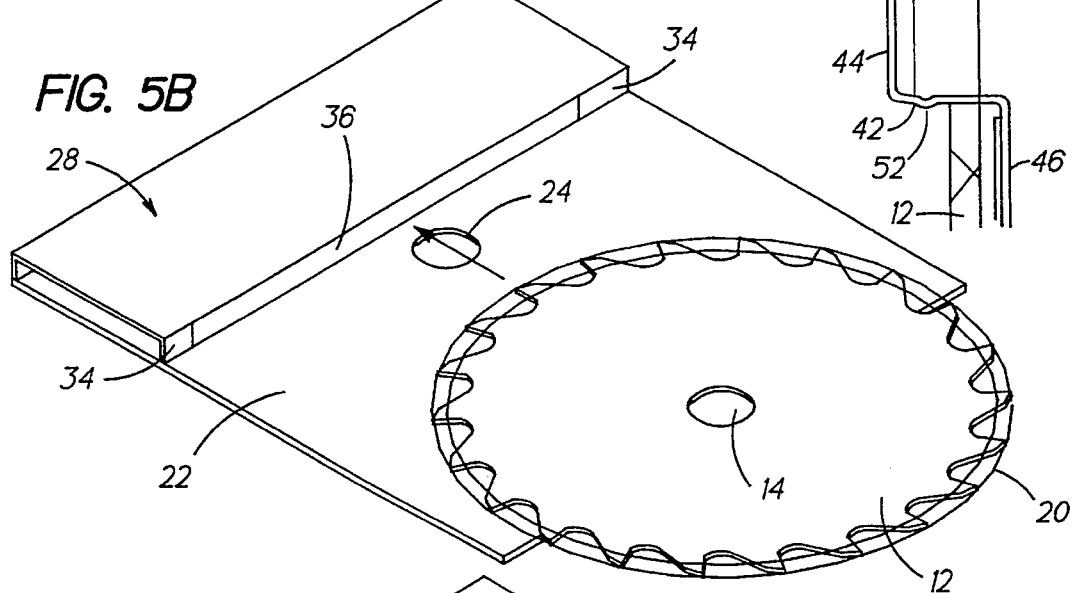
Figure 5C:
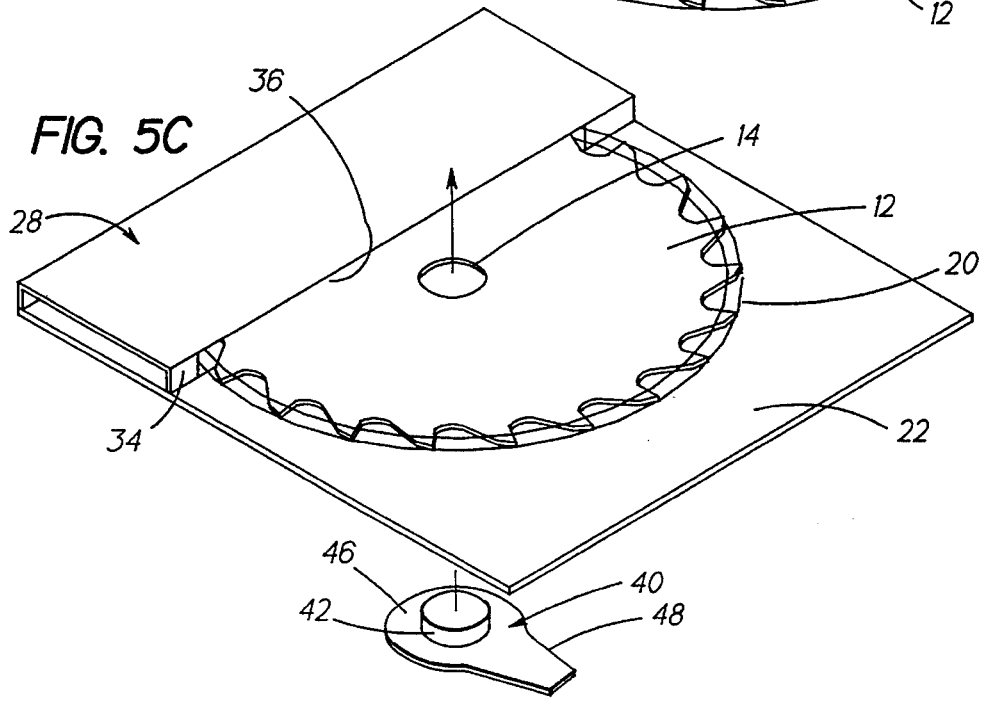
Figure 7A:
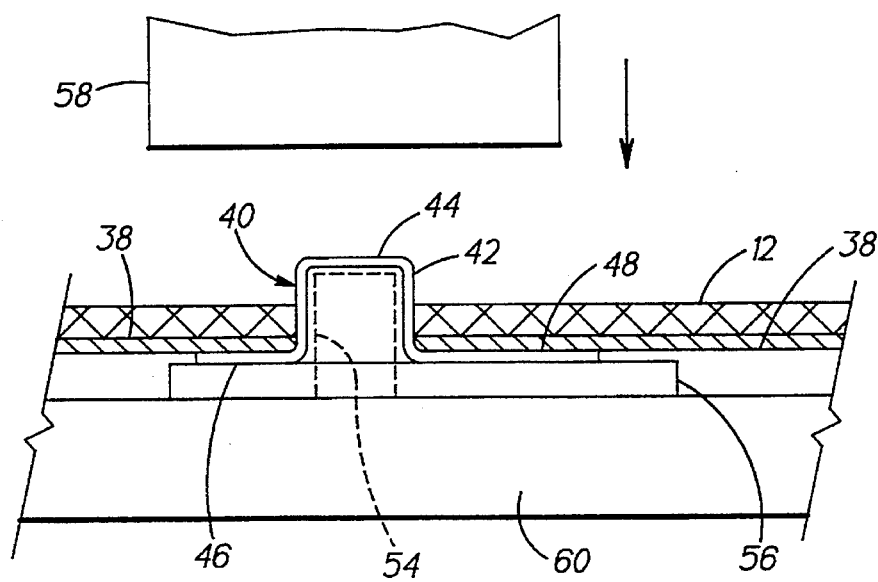
FIGS. 7A, 7B and 7C are schematic elevational sectional detail views illustrating additional steps in the method of the present invention.
Figure 7B:
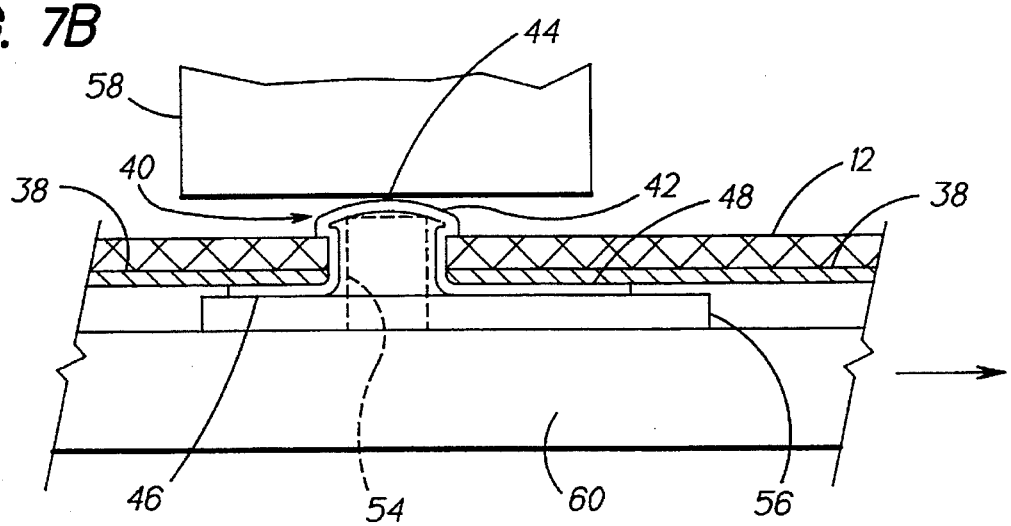
Figure 7C:
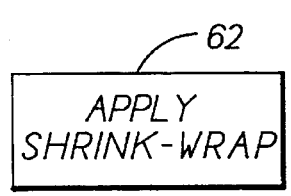

A method for making the display package of the present invention is shown in FIGS. 5A, 5B, 5C and FIGS. 7A, 7B and 7C. With reference to FIGS. 5A through 5C, a length of split transparent plastic tubing or other protective member is wrapped around the periphery of the blade 12, which is then inserted into the tool-receiving slot 36 of the pouch 28 so that the saw blade aperture 14 is aligned with the display card hole or connecting aperture 24. It should be noted at this point, that for the embodiment in which no pocket is used, a plain display card 22 is provided and the saw blade 12 is placed against it such that the apertures 14 and 24 are aligned. The step illustrated in FIG. 5C is common for both the pocketed and the unpocketed embodiments. The connecting member 40 is inserted from the back of the package adjacent the display card 22, so that the post 42 enters both the connecting aperture 24 of the card 22 and the aperture 14 of the circular saw blade or similar article. The package is then placed on a conveyor belt as shown in FIGS. 7A and 7B.

Here a locating and spacing button 54 (shown in phantom) is mounted on a backing member 56. The locating and spacing button 54 is used to provide a limit to the amount of deformation experienced by the post 42 of the connecting member 40. A press 58 is applied against the distal end 44 of the post 42 to deform it as previously described and as shown in FIG. 6. Note that the deformation "mushroom" is exaggerated as shown in the schematic of FIG. 7B. For the disclosed embodiments, it has been found that the press should apply pressure in the range from 77 to 94 psi, with an optimum amount of 85 psi, at a temperature range from 144° to 176° Fahrenheit, with an optimum of 160° Fahrenheit. The pressure and temperature, when applied for two to three seconds, accomplishes the desired deformation. As shown by the box 62 in FIG. 7C, the final step is applying the layer of shrink-wrap.

The above-described embodiments, of course, are not to be construed as limiting the breadth of the present invention. Modifications, and other alternative constructions, will be apparent which are within the spirit and scope of the invention as defined in the appended claims.

What is claimed is:

1. A method for packaging a circular saw blade or similar article for merchandising display, comprising the steps of:

inserting a circular saw blade or similar article having a central aperture into a pocket formed on a display card so that a portion of the saw blade extends out of the pocket and a hole formed in the card is aligned with the central aperture;

inserting a deformable connecting member having first and second retaining portions through said aligned hole and central aperture so that one of said first and second retaining portions extends outwardly from said card and the other of said first and second retaining portions extends outwardly from said saw blade or similar article; and deforming said portion extending from said saw blade or similar article so that said deformed portion and said other retaining portion normally retain said saw blade or similar article in said pocket while on display, while permitting a person to remove said connecting member from at least said blade or similar article without impairing said display card's usefulness for subsequently storing said circular saw blade or similar article.

2. The method claimed in claim 1, further comprising the step of shrink-wrapping a quantity of shrink-wrappable material about the combination of said blade or similar article and said display member after said step of deforming.

3. The method claimed in claim 1, further comprising the step of applying a protective covering to at least a portion of the outer periphery of said blade or similar article prior to the step of inserting said blade or similar article into said pocket.

4. The method claimed in claim 2, further comprising the step of applying a protective covering to at least a portion of the outer periphery of said blade or similar article prior to the step of inserting said blade or similar article into said pocket.

5. The method claimed in claim 1, wherein:

said connecting member first retaining portion includes a deformable thermoplastic post sized to pass through said aligned aperture and hole; and wherein a predetermined amount of heat and pressure is applied to said thermoplastic post so that it deforms to a diameter greater than the largest dimension of the aperture of said saw blade or similar article.

6. The method claimed in claim 5, wherein:

said connecting member second retaining portion includes a flange portion having a width greater than the largest dimension of said card hole; and said step of inserting said connecting member includes inserting said connecting member such that said flange portion engages said card.

7. The method claimed in claim 6, wherein said flange portion further includes a finger-grasping portion.

8. The method claimed in claim 7, wherein said connecting member is a one-piece unitary plastic structure.

9. A display package and circular saw blade combination, comprising:

a circular saw blade defining a central aperture and having a predetermined diameter and thickness, and further having descriptive information on a surface thereof;

a display member having a pouch configured to contain a portion of the saw blade and further defining a connecting aperture;

the pouch having a height less than the predetermined diameter of the saw blade so that said descriptive information is visible to a prospective purchaser of the saw blade when the saw blade is inserted in the pouch; and a connecting member extending through said saw blade central aperture and said display member connecting aperture for releasably holding said saw blade in said pouch, such that a purchaser of said combination can remove said connecting member from at least said saw blade without destroying said package's usefulness as a container for said saw blade.

10. The combination claimed in claim 9, further comprising a protective covering extending about at least a portion of the periphery of said saw blade.

11. The combination claimed in claim 10, wherein said protective covering includes a resilient plastic member having a "U"-shaped cross section covering the teeth of said saw blade.

12. The combination claimed in claim 11, further comprising a layer of shrink-wrap material shrink-wrapped around said blade and display member.

13. The combination claimed in claim 9, wherein said connecting member includes a deformable member deformed to a diameter slightly greater than the diameter of the saw blade central aperture and bearing against the saw blade, and further includes a flange portion bearing against the display member.

14. A display package for a tool defining a tool aperture, comprising:

a display card having a pocket portion;

the pocket portion being sized to hold a first portion of the tool so that a second portion of the tool is exposed to view when the tool is inserted in the pocket portion;

the display card further including a card aperture aligned with the tool aperture when the tool is inserted in the pocket portion; and connecting means operatively associated with the card aperture and the tool aperture for releasably holding the tool in the pocket portion.

15. The display package claimed in claim 14, further comprising a layer of shrink-wrap material shrink-wrapped about the display package with the tool inserted in said pocket portion.

16. The display package claimed in claim 14, wherein:

the connecting means includes a first retaining portion and a second retaining portion; and the first and second retaining portions normally retain the tool and display card sandwiched together.

17. The display package claimed in claim 16, wherein:

the first retaining portion includes a deformable post inserted through said aligned card and tool apertures, a distal end portion of which post being deformed to a diameter greater than the largest dimension of said tool aperture; and the second retaining portion includes a flange portion bearing against the display card.

18. A display package for a tool such as a circular saw blade or similar article, comprising:

a display card formed of a single length of paperboard material and having an upper portion and a lower portion;

the lower portion having a lower edge and including a pouch extending outwardly from a front face of the card a predetermined distance greater than the thickness of the tool;

the pouch being defined by a flap of said paperboard material integral with, and extending outwardly from, said lower edge by an amount equal to said predetermined distance, thence upwardly to a predetermined height in a plane parallel to said front face, thence inwardly to and joining said front face thereby forming a pouch upper surface; and said pouch upper surface defining a tool-receiving slot configured to accept at least a portion of said tool.

19. The display package claimed in claim 18, wherein said tool defines an aperture and said card upper portion defines a first hole, such that when said portion of said tool is inserted in said pouch, said aperture and first hole are aligned.

20. The display package claimed in claim 19, wherein said first hole is spaced above said pouch upper surface, and further comprising at least one hang hole formed in said card upper portion above said first hole.

21. The display package claimed in claim 20, further comprising connecting means operatively associated with said aligned aperture and first hole for releasably retaining said tool in said pouch.

22. A display package and circular saw blade combination, comprising:

a circular saw blade defining a central aperture;

a display card adjacent the saw blade and defining a connecting aperture aligned with the blade central aperture;

a connecting member connecting the saw blade and display card;

the connecting member having a deformable retaining portion and a generally planar retaining flange;

the deformable retaining portion extending through both said apertures and having a distal end deformed against the blade to a diameter greater than the diameter of the blade aperture; and the retaining flange bearing against the surface of said card.

23. The combination claimed in claim 22, further comprising shrink-wrap material shrink-wrapped over the package and saw blade combination to assist in maintaining the saw blade connected to the display card.

24. The combination claimed in claim 22, further comprising a pocket formed on a lower portion of the display card and sized to accept at least a portion of the saw blade so that descriptive information on the saw blade is visible to a potential purchaser.

25. The combination claimed in claim 22, further comprising transparent resilient protective tubing placed around the periphery of the saw blade and covering at least a portion of the saw teeth.

26. The combination claimed in claim 25, further comprising a layer of shrink-wrap material shrink-wrapped about the package and saw blade combination to assist in retaining the saw blade connected to the display card.

27. The combination claimed in claim 22, wherein the distal end of the deformable portion is sized to permit a purchaser to readily remove the connecting member from the blade and display card.

28. The combination claimed in claim 27, wherein the connecting member is formed as a single unitary piece of polyvinyl chloride material.

29. A method for connecting a circular saw blade or similar article having a central aperture to a paperboard member comprising the steps of:

forming a hole in the paperboard member;

placing the circular saw blade or similar article against the paperboard member so that the central aperture and hole are aligned;

inserting at least part of a unitary plastic connecting member having a deformable post and having a flange portion into the hole and through the saw blade central aperture such that a distal end portion of the deformable post protrudes outwardly from the surface of the blade or similar article a predetermined amount and such that the flange bears against the paperboard member; and deforming the distal end portion of the post such that a diameter of the deformed distal end portion normally is greater than the diameter of the blade aperture but small enough that the post may be readily withdrawn from the blade or similar article by a user pulling the flange.

30. The method claimed in claim 29, further comprising the step of shrink-wrapping at least one layer of shrink-wrap material about the blade and paperboard member after the step of deforming the distal end portion of the post.

\* \* \* \* \*